United States Patent
Endo

(10) Patent No.: US 8,525,922 B2
(45) Date of Patent: Sep. 3, 2013

(54) IMAGING DEVICE CAPABLE OF REDUCING POWER CONSUMPTION

(75) Inventor: Hiroshi Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 323 days.

(21) Appl. No.: 12/938,575

(22) Filed: Nov. 3, 2010

(65) Prior Publication Data

US 2011/0043659 A1    Feb. 24, 2011

Related U.S. Application Data

(62) Division of application No. 11/846,034, filed on Aug. 28, 2007, now Pat. No. 7,855,745.

(30) Foreign Application Priority Data

Aug. 28, 2006   (JP) ................... 2006-230338

(51) Int. Cl.
*H04N 5/232*    (2006.01)

(52) U.S. Cl.
USPC .......................................... 348/353; 348/349

(58) Field of Classification Search
USPC ................ 348/345–354, 208.11, 208.12
See application file for complete search history.

(56) References Cited

U.S. PATENT DOCUMENTS

| | | | |
|---|---|---|---|
| 2004/0189856 A1* | 9/2004 | Tanaka | 348/345 |
| 2004/0201751 A1* | 10/2004 | Bell et al. | 348/231.99 |
| 2005/0185064 A1 | 8/2005 | Ogawa | |

FOREIGN PATENT DOCUMENTS

| | | | |
|---|---|---|---|
| JP | 08-075984 A | | 3/1996 |
| JP | 2001-249267 | * | 9/2001 |
| JP | 2001-249267 A | | 9/2001 |
| JP | 2003-005024 A | | 1/2003 |
| JP | 2003-295039 | * | 10/2003 |
| JP | 2003-295039 A | | 10/2003 |

OTHER PUBLICATIONS

Notification of Reasons for Refusal, dated Jan. 12, 2011, issued in corresponding JP Application No. 2006-230338, 4 pages in English and Japanese.

* cited by examiner

*Primary Examiner* — Tuan Ho
*Assistant Examiner* — Akshay Trehan
(74) *Attorney, Agent, or Firm* — Sughrue Mion, PLLC

(57) ABSTRACT

An electronic camera is provided with a power-saving S-AF mode and a C-AF mode as focus adjustment modes. In the S-AF mode, focus adjustment is performed upon half depression of a release button. In the C-AF mode, the focus adjustment is repeated during a shooting mode regardless of the half depression of the release button to simplify the focus adjustment of a shooting time so that shooting is smoothly performed. When the electronic camera is set to the shooting mode, an AF controller obtains an Ev value representing subject brightness. The Ev value is compared with a threshold value stored in a memory. When the Ev value exceeds the threshold value, the focus adjustment mode is changed to the S-AF mode. When the Ev value falls below the threshold value, the focus adjustment mode is changed to the C-AF mode.

7 Claims, 9 Drawing Sheets

IMAGING DEVICE CAPABLE OF REDUCING POWER CONSUMPTION

This application is a divisional of U.S. application Ser. No. 11/846,034, filed Aug. 28, 2007, which claims priority from JP 2006-230338, filed Aug. 28, 2006, each of which is incorporated hereby by reference in its entirety.

FIELD OF THE INVENTION

The present invention relates to an imaging device in which a regular image for recording is taken at the moment a release button has been operated during a take of a through image and the taken regular image is stored in a storage medium.

BACKGROUND OF THE INVENTION

Imaging devices of an electronic camera and so forth provided with an autofocus (AF) function are well known. In this kind of the imaging device, focus adjustment is automatically performed and shooting of a through image (through-image shooting) is commenced by setting a shooting mode. When a release button is pressed halfway in the shooting mode, the focus adjustment is performed. Upon full depression of the release button, taking a regular image for recording (regular shooting) is performed. The regular image is stored in a storage medium of a memory card and so forth.

In the case the focus adjustment is performed when the release button is pressed halfway, there arises a problem in that the regular shooting is not smoothly performed if it takes a time to perform the focus adjustment. In view of this, some of the imaging devices are provided with a focus adjustment mode referred to as a continuous AF mode wherein the focus adjustment is repeated during the shooting mode regardless of the operation of the release button (see Japanese Patent Laid-Open Publication Nos. 08-75984 and 2003-5024, for instance). Meanwhile, such as described in Japanese Patent Laid-Open Publication No. 2003-295039, some of the imaging devices are capable of changing the continuous AF mode and a single AF mode wherein the focus adjustment is performed in response to an input operation (half press of the release button and so forth) instructing the focus adjustment.

In the continuous AF mode, since the focus adjustment is repeated, it is possible to smoothly perform the regular shooting. However, there is a problem that power consumption increases in comparison with the single AF mode.

SUMMARY OF THE INVENTION

In view of the foregoing, it is a primary object of the present invention to provide an imaging device capable of reducing power consumption as well as smoothly performing regular shooting.

In order to achieve the above and other objects, the imaging device according to the present invention comprises a first focus adjuster, a mode selector, a subject-brightness detector and a mode controller. When a release button has been operated during a take of a through image, shooting of a regular image to be stored in a storage medium is performed. The first focus adjuster performs focus adjustment by driving a focus lens so as to maximize a focus evaluation value representing contrast of the through image. The mode selector changes a focus adjustment mode between a continuous AF mode in which the focus adjustment is repeated during the take of the through image, and a single AF mode in which the focus adjustment is performed at the moment the release button has been operated during the take of the through image. The subject-brightness detector detects subject brightness. When the subject brightness exceeds a predetermined threshold value, the mode controller changes the focus adjustment mode to the single AF mode. When the subject brightness falls below the threshold value, the mode controller changes the focus adjustment mode to the continuous AF mode.

Incidentally, the present invention is based on the following findings. Time required for the focus adjustment tends to be longer as the subject brightness is lower and a focal length is longer. When the subject brightness is high to some extent or when the focal length is short to some extent, the focus adjustment is rapidly completed so that shooting of the regular image is smoothly performed even in the single AF mode.

Another imaging device according to the present invention comprises the first focus adjuster, the mode selector, a focal-length detector and another mode controller. The focal-length detector detects a focal length on the basis of a position of a zoom lens. When the focal length falls below a predetermined threshold value, the mode controller changes the focus adjustment mode to the single AF mode. When the focal length exceeds the threshold value, the mode controller changes the focus adjustment mode to the continuous AF mode.

It is preferable to further comprise a subject-distance measuring unit, a second focus adjuster, a judgment portion and a threshold-value changer. The subject-distance measuring unit measures a subject distance prior to an operation of the first focus adjuster. On the basis of the measured subject distance, the second focus adjuster narrows a movement range of the focus lens to be moved by the first focus adjuster. The judgment portion judges whether the measured subject distance is proper or not. When it has been judged that the subject distance is proper, the threshold-value changer changes the threshold value so as to lower a ratio of selection of the continuous AF mode.

It is preferable to provide an informing unit for notifying the focus adjustment mode currently selected.

It is preferable that the focus adjustment mode selected at a shooting time is stored in the storage medium as additional information added to the regular image.

According to the imaging device of the present invention, the continuous AF mode is selected when the subject brightness is lower than the predetermined threshold value or when the focal length is longer than the predetermined threshold value. In other words, the continuous AF mode is adapted to be selected in the case that it takes a time to perform the focus adjustment. Except for this case, the single AF mode is adapted to be selected. Therefore, regular shooting is smoothly performed and power consumption is reduced.

When the subject-distance measuring unit is provided and it is possible to perform the focus adjustment by utilizing the subject distance, a time required for the focus adjustment can be shortened. In this case, the power consumption is further reduced by changing the threshold value so as to lower the ratio of selection of the continuous AF mode.

DESCRIPTION OF THE PREFERRED EMBODIMENTS

Figure 1:
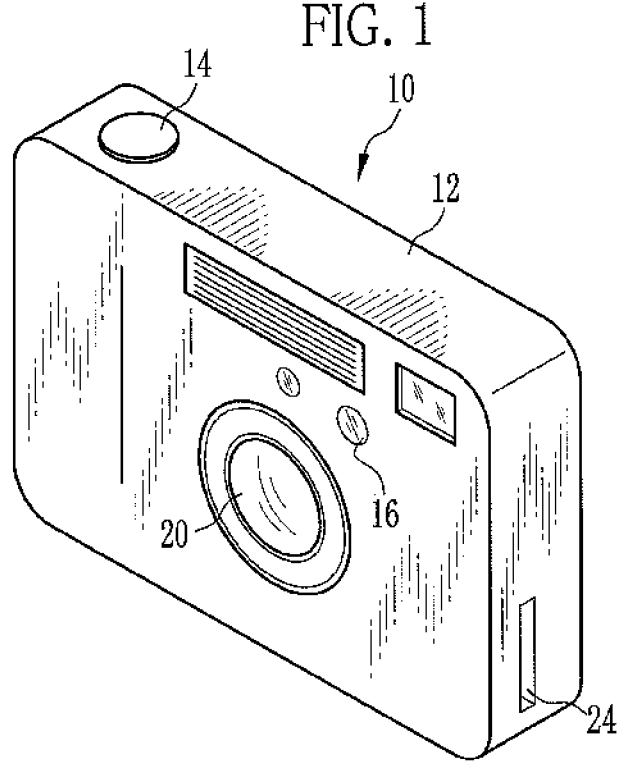
FIG. 1 is a perspective view showing a front side of an electronic camera.
Figure 2:
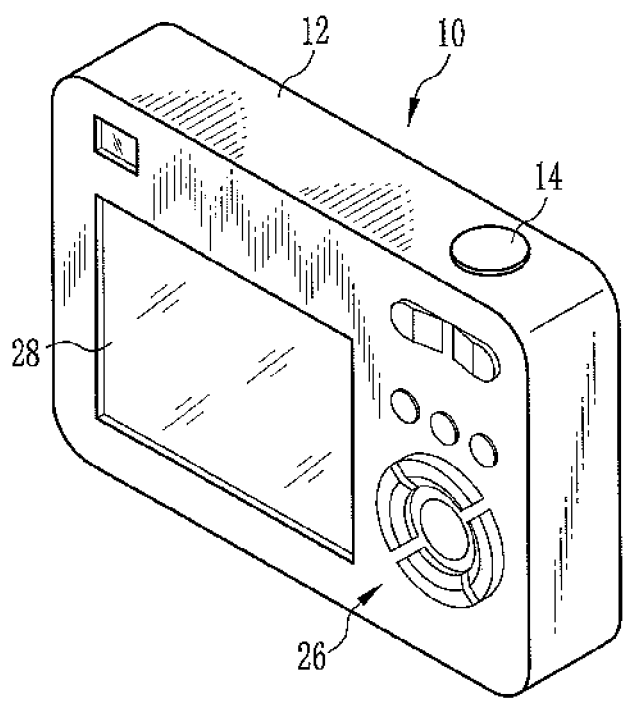
FIG. 2 is a perspective view showing a rear side of the electronic camera.

In FIGS. 1 and 2, an electronic camera 10 according to the present invention is provided with a release button 14 disposed at a top side of a camera body 12. The release button 14 is composed of a push switch which is adapted to be depressed in two steps. By depressing the release button 14 down to the first step (by half depression), instructions of exposure adjustment and focus adjustment are inputted. Further, by depressing the release button 14 down to the second step (by full depression), an instruction for taking a regular image to be used for recording is inputted.

A front side of the camera body 12 is provided with a photometry window 16 and a zoom lens 20. Through the photometry window 16, subject light is led to a brightness sensor 15 (see FIG. 3) to measure subject brightness. The zoom lens 20 composes an imaging optical system 18 (see FIG. 3). A lateral side of the camera body 12 is provided with a memory card slot 24 into which a memory card 22 (see FIG. 3) is removably loaded. A rear side of the camera body 12 is provided with an operating portion 26 for performing various operations, and a liquid crystal display (LCD) 28 for showing various displays.

The electronic camera 10 possesses functions of automatic exposure adjustment (AE) and automatic focus adjustment (AF). By fully depressing the release button 14 in a shooting mode, shooting is performed in a full-automatic manner. Image data obtained by this shooting is stored in the memory card 22. Although details are described later, the electronic camera is provided with a single AF (S-AF) mode and a continuous AF (C-AF) mode as focus adjustment modes. In the S-AF mode, focus adjustment is performed when the release button 14 is depressed halfway. In the C-AF mode, focus adjustment is repeatedly performed during the shooting mode regardless of the half depression of the release button 14. The focus adjustment modes are adapted to be automatically changed in accordance with the subject brightness.

The operating portion 26 is provided with a power button for turning on and off a power supply, a mode selecting button for changing the respective modes of the shooting mode, a reproduction mode and a menu mode, and a cursor key to be mainly used in the menu mode. The LCD 28 displays a so-called through image in the shooting mode. In the reproduction mode, the LCD 28 reproduces an image recoded in the memory card 22. In the menu mode, the LCD 28 displays a menu screen for performing various kinds of setting.

Figure 3:
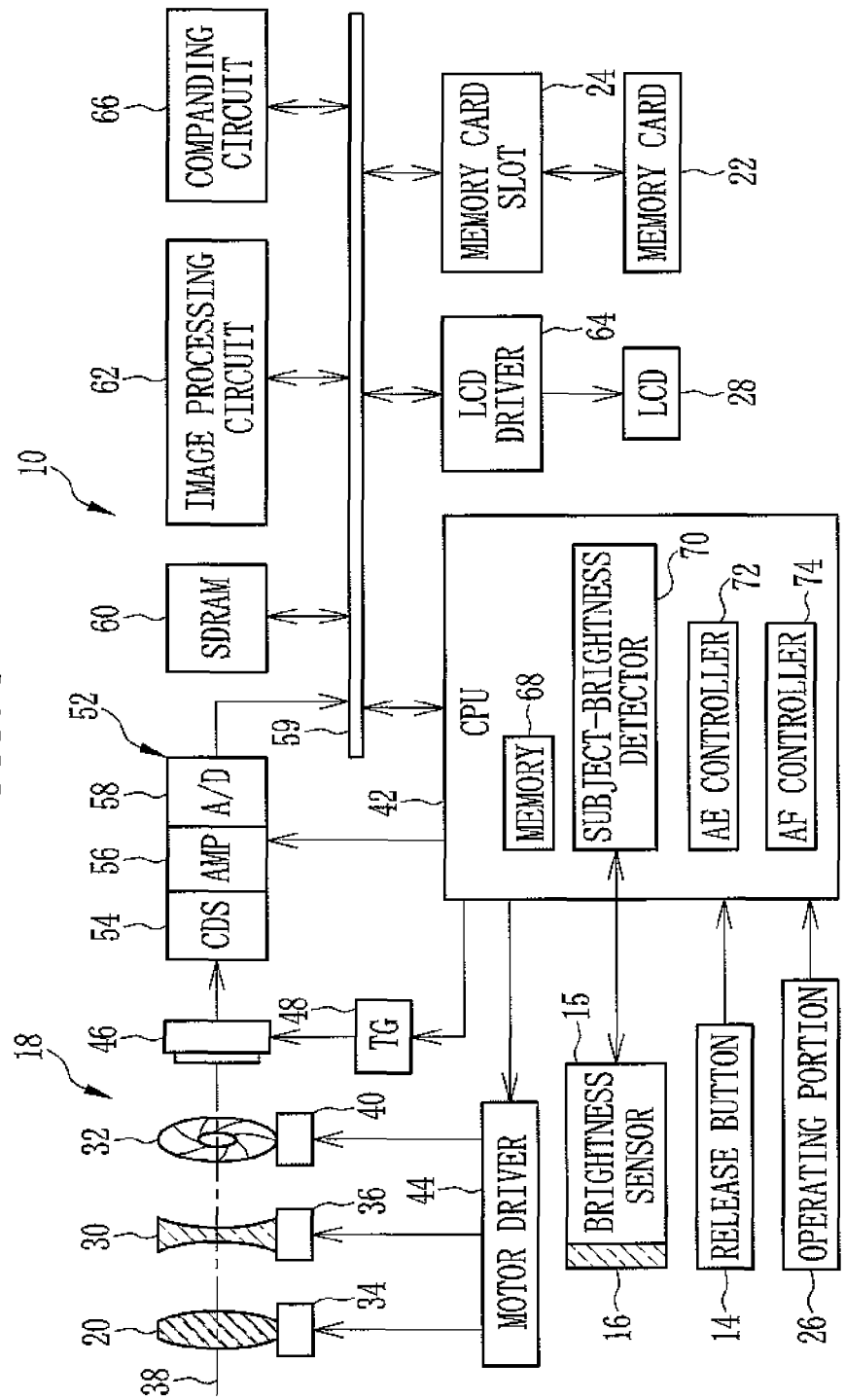
FIG. 3 is a block diagram showing a structure of the electronic camera.
Figure 4:
FIG. 4 is an illustration showing composition of an image file.

In FIG. 3, the imaging optical system 18 is composed of the zoom lens 20 for changing a focal length, a focus lens 30 for performing the focus adjustment, and a stop 32 for performing the exposure adjustment. The zoom lens 20 and the focus lens 30 are actuated by a zoom motor 34 and a focus motor 36 respectively so as to move along an optical axis 38. The stop 32 is actuated by an iris motor 40 to change an f-number by altering a diameter of a stop aperture which opens the optical axis 38.

The respective motors 34, 36 and 40 are a stepping motor and are activated by a drive pulse sent from a motor driver 44 connected to a CPU 42. The CPU 42 regulates a number of the drive pulses to be sent to the respective motors 34, 36 and 40 to control positions of the zoom lens 20 and the focus lens 30 as well as the diameter of the stop aperture.

A solid-state image sensor, or a CCD image sensor (hereinafter referred to as CCD) 46 is disposed behind the imaging optical system 18. As is well known, the CCD 46 comprises a photoelectric conversion surface on which photoelectric conversion elements are allayed. The CCD 46 outputs an image signal produced by photoelectrically converting a subject light having entered the photoelectric conversion surface. A timing generator (TG) 48 controlled by the CPU 42 is connected to the CCD 46 to determine a shutter speed of an electronic shutter (charge accumulating period of the respective photoelectric conversion elements) on the basis of a timing signal (clock pulse) inputted from the TG 48. Upon setting the electronic camera 10 to the shooting mode, the CCD 46 commences taking a through image in a state that a pixel number is decreased. When the release button 14 has been fully depressed during the shooting mode, the CCD 46 suspends the take of the through image and performs shooting of a regular image for recording.

The image signal outputted from the CCD 46 is inputted into an analog-signal processing circuit 52 comprising a correlative double sampling circuit (CDS) 54, an amplifier (AMP) 56 and an A/D converter (A/D) 58. By the CDS 54, image data of R, G and B correctly corresponding to an accumulated charge amount of each pixel are produced from the image signal. The produced image data is amplified by the AMP 56. The amplified image data is digitally converted by the A/D 58. The digital image data outputted from the A/D 58 is temporarily stored in an SDRAM 60, which acts as an image memory for working, via a data bus 59.

An image processing circuit 62 reads the image data from the SDRAM 60 to perform various kinds of image processing of gradation conversion, white-balance correction, gamma correction processing, YC conversion processing and so forth. The processed image data is stored in the SDRAM 60 again. The image data for which the image processing has been performed by the image processing circuit 62 and which is obtained as the through image is converted into a composite signal by an LCD driver 64 and is displayed on the LCD 28.

Meanwhile, the image data obtained as the regular image for recording is compressed by a companding circuit 66 in a predetermined compression format (JPEG format, for instance). After that, the CPU 42 produces an image file of a predetermined format (Exif format, for instance) storing the compressed image data of the regular image and additional information (tag information) concerning this image data. The produced image file is stored in the memory card 22 via the memory card slot 24. As the tag information, are stored model information of the electronic camera 10, shooting conditions and so forth.

The CPU 42 is provided for integrally controlling the electronic camera 10 and is connected to the respective parts thereof. The CPU 42 comprises a memory 68 storing various control programs and various setting information concerning a threshold value (6 Ev, for instance) of subject brightness and so forth. The threshold value of subject brightness is used in changing the focus adjustment mode described later. On the basis of the programs and the setting information, the CPU 42 controls the respective parts connected thereto.

The CPU 42 further comprises a subject-brightness detector 70, an AE controller 72 and an AF controller 74. The subject-brightness detector 70 is connected to the brightness sensor 15 and activates this sensor 15 to obtain an Ev value representing the subject brightness.

On the basis of the image data, which is outputted from the CCD 46 and is stored in the SDRAM 60, and the Ev value obtained by the subject-brightness detector 70, the AE controller 72 determines the f-number and the shutter speed of the electronic shutter so as to make the shooting conditions optimum. And then, the stop 32 and the CCD 46 are activated so as to obtain the determined f-number and the determined shutter speed to perform the exposure adjustment.

In the meantime, the AF controller 74 performs the focus adjustment on the basis of a principle that focusing becomes better as a contrast of an image becomes higher. The focus adjustment includes preliminary adjustment and regular adjustment performed after the preliminary adjustment. In the preliminary adjustment, the AF controller 74 moves the focus lens 30 in comparatively large movement steps within a search range extending from a near position, where a near-distance subject is brought into focus, to an infinite position, where a far-distance subject is brought into focus. While the focus lens 30 is moved, the image data obtained at each step is analyzed to calculate a focus evaluation value representing the contrast of the image. For the last time, the focus lens 30 is moved to a position (preliminary focus position) where the focus evaluation value becomes maximum. In this way, the preliminary adjustment is completed.

In the regular adjustment, the AF controller 74 moves the focus lens 30 in comparatively small movement steps within a narrow search range adjacent to the preliminary focus position. While the focus lens 30 is moved, the image data obtained at each step is analyzed to calculate the focus evaluation value representing the contrast of the image. For the last time, the focus lens 30 is moved to a position (focus position) where the focus evaluation value becomes maximum. In this way, the regular adjustment is completed.

As described above, the electronic camera 10 is provided with the S-AF mode and the C-AF mode, which have different timing for performing the preliminary adjustment, as the focus adjustment mode. The AF controller 74 performs the focus adjustment, changing the two focus adjustment modes. Procedures for changing the focus adjustment modes and for adjusting the focus in the respective focus adjustment modes are described below with reference to drawings.

Figure 5:
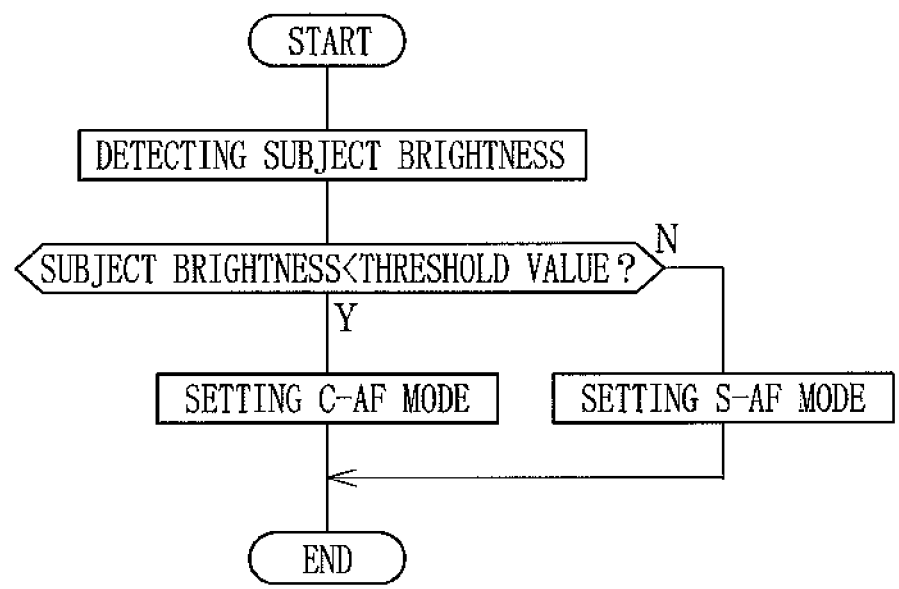
FIG. 5 is a flowchart showing a procedure for changing a focus adjustment mode.

Upon setting the electronic camera 10 to the shooting mode, the AF controller 74 activates the subject-brightness detector 70 to obtain the Ev value. As shown in FIG. 5, the Ev value is compared with the threshold value of the subject brightness stored in the memory 68. When the Ev value exceeds the threshold value, the AF controller 74 changes the focus adjustment mode to the S-AF mode. When the Ev value falls below the threshold value, the AF controller 74 changes the focus adjustment mode to the C-AF mode.

Figure 6:
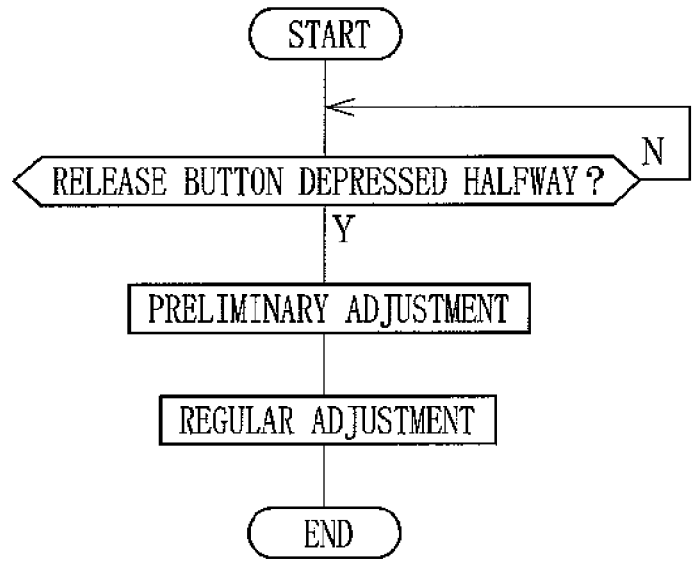
FIG. 6 is a flowchart showing a procedure for adjusting a focus in an S-AF mode.
Figure 7:
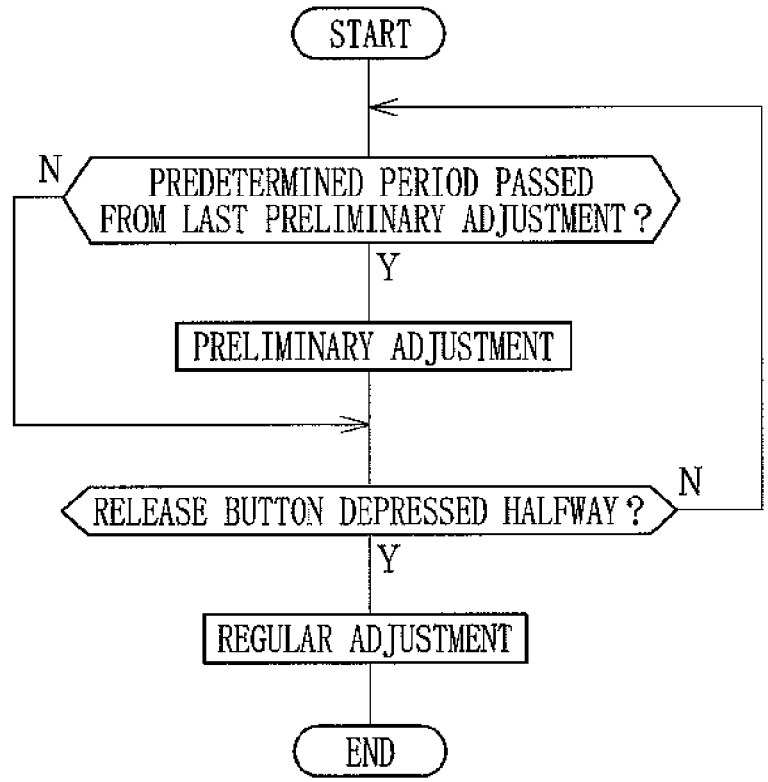
FIG. 7 is a flowchart showing a procedure for adjusting a focus in a C-AF mode.

As shown in FIG. 6, in the S-AF mode, the AF controller 74 performs the preliminary adjustment and the regular adjustment sequentially when the release button 14 is depressed halfway. Meanwhile, as shown in FIG. 7, in the C-AF mode, the AF controller 74 performs the preliminary adjustment in predetermined cycles after the electronic camera 10 has been set to the C-AF mode and before the release button 14 is depressed halfway. And then, the regular adjustment is performed upon the half depression of the release button 14.

An operation of the present invention according to the above structure is described below. The AF controller 74 performs switching of the focus adjustment mode while the electronic camera 10 is set to the shooting mode. When the Ev value obtained by the subject-brightness detector 70 exceeds the threshold value stored in the memory 68, the S-AF mode is selected to perform the preliminary adjustment and the regular adjustment at the time when the release button 14 is depressed halfway. When the Ev value falls below the threshold value, the C-AF mode is selected to perform the preliminary adjustment in the predetermined cycles until the half depression of the release button 14. And then, the regular adjustment is performed upon the half depression of the release button 14.

In the C-AF mode, power consumption increases in comparison with the S-AF mode because the preliminary processing is repeated. However, since it is unnecessary to perform the preliminary processing at the moment of the full depression of the release button 14, there is an advantage that a time for the focus adjustment is shortened. In this regard, when the subject brightness is low, it is necessary to lengthen an exposure period of the CCD 46 in obtaining the image data to be used for the focus adjustment, and thus a time taken for the focus adjustment tends to be longer.

In contrast, when the subject brightness exceeds the threshold value, it is possible to smoothly perform the focus adjustment. At this time, the electronic camera 10 is adapted to be switched to the S-AF mode. In case the subject brightness falls below the threshold value and a time is to be taken for the focus adjustment, the electronic camera 10 is adapted to be switched to the C-AF mode. By virtue of this, the electronic camera 10 is capable of reducing the power consumption without disturbing smooth shooting.

In the above embodiment, the subject brightness is detected on the basis of the amount of the subject light having entered the brightness sensor. The present invention, however, is not limited to this. For example, the subject brightness may be detected on the basis of the image data outputted from the CCD.

Further, in the above embodiment, the S-AF mode and the C-AF mode are switched in accordance with the subject brightness. The present invention, however, is not limited to this. For example, the S-AF mode and the C-AF mode may be switched in accordance with a focal length such as an electronic camera 80 shown in FIG. 8. By the way, in the following description referring to FIG. 8 and subsequent drawings thereof, a component identical with that of the above embodiment is denoted by the same reference numeral and its description is omitted.

Figure 8:
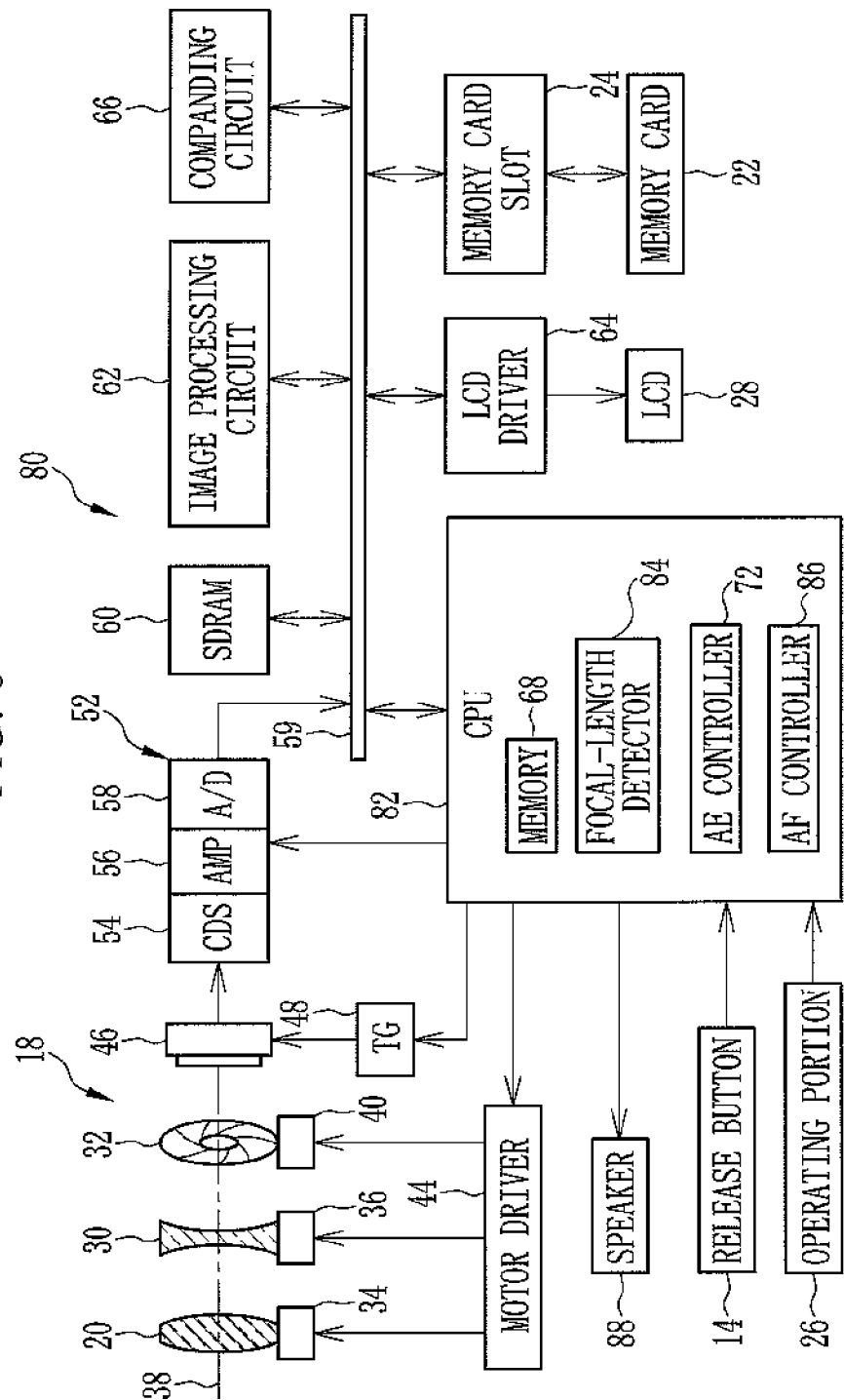
FIG. 8 is a block diagram showing a structure of another electronic camera.
Figure 9:
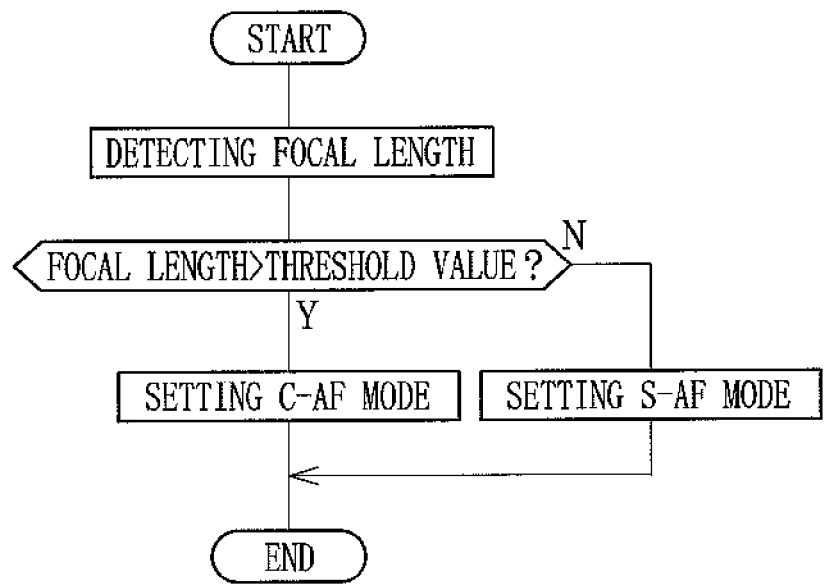
FIG. 9 is a flowchart showing a procedure for changing the focus adjustment mode.

In FIG. 8, a CPU 82 of the electronic camera 80 comprises a focal-length detector 84, which detects a position of the zoom lens 20 by counting a number of the drive pulses supplied to the zoom motor 34 by the motor driver 44. On the basis of the detected position of the zoom lens 20, the focal length is detected.

The memory 68 of the electronic camera 80 stores a threshold value (30 mm, for instance) of the focal length. Upon setting the electronic camera 80 to the shooting mode, an AF controller 86 activates the focal-length detector 84 to obtain the focal length and compares the obtained focal length with the threshold value stored in the memory 58. When the focal length falls below the threshold value, the focus adjustment mode is changed to the S-AF mode. When the focal length exceeds the threshold value, the focus adjustment mode is changed to the C-AF mode.

When the focal length is long (the zoom lens 20 is positioned at a telephoto side), depth of field is shallow and it takes a time to adjust the focus. In contrast, when the focal length falls below the threshold value, it is possible to smoothly perform the focus adjustment. At this time, the electronic camera 80 is adapted to be switched to the S-AF mode. In case the focal length exceeds the threshold value and a time is to be taken for the focus adjustment, the electronic camera 80 is adapted to be switched to the C-AF mode. By virtue of this, the electronic camera 80 is capable of reducing the power consumption without disturbing smooth shooting.

Incidentally, it is not exclusive that the focus adjustment mode is changed on the basis of either one of the subject brightness and the focal length. The focus adjustment mode may be changed on the basis of both the subject brightness and the focal length. In this case, it is considered that the C-AF mode is selected only when the subject brightness falls below the threshold value and the focal length exceeds the threshold value, for example.

In the present invention, the structure of each component is not limited to the above embodiments on condition that the S-AF mode and the C-AF mode are provided to select the S-AF mode in the case the focus adjustment is smoothly performed and to select the C-AF mode in the case it takes a time to adjust the focus. For example, the focus adjustment mode selected at a shooting time may be stored in the memory card as the tag information of the taken image data. By doing so, it is possible to check whether or not the selection of the focus adjustment mode affects a failure of shooting if the failure of shooting occurs.

Figure 10:
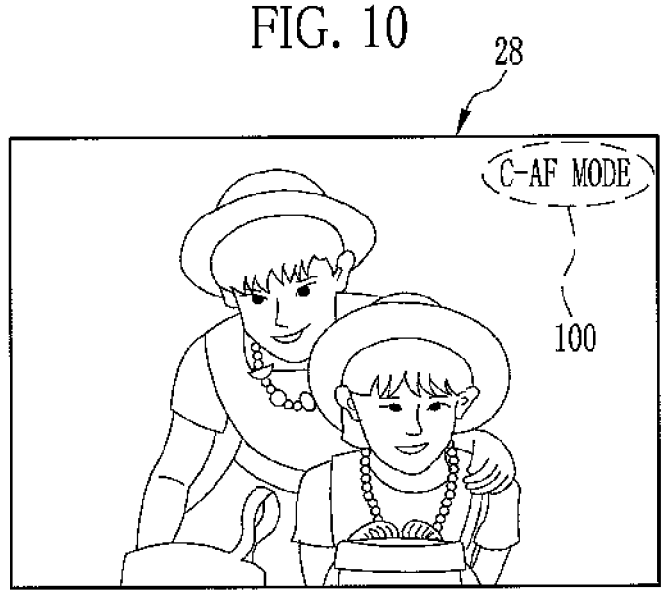
FIG. 10 is an explanatory illustration showing the indicated focus adjustment mode.

The focus adjustment mode currently selected may be informed. In this case, as shown in FIG. 10 for example, a mark 100 representing the currently selected focus adjustment mode may be displayed on the LCD 28 together with the though image. Moreover, a speaker 88 (see FIG. 8) may be provided to notify the currently selected focus adjustment mode by generating a sound.

When the focus adjustment mode is informed in this way, it is possible to perform the shooting in consideration of the focus adjustment mode so that a failure of shooting time is prevented. When the S-AF mode is selected, a drive sound of the focus adjustment is not generated until the release button is depressed halfway. Meanwhile, when the C-AF mode is selected, the drive sound of a focus-lens movement sound and so forth are generated before the release button is depressed halfway. Difference of the drive sounds can make a user recognize the difference of the focus adjustment mode.

Regarding the concrete focus adjusting method in the respective focus adjustment modes of the S-AF mode and the C-AF mode, the above embodiments are not exclusive and various methods already known may be adopted. In the foregoing embodiment, the preliminary adjustment is repeated in the predetermined cycles until the release button is depressed halfway in the C-AF mode. However, after performing the preliminary adjustment by one time, the CCD may be activated to obtain the image data in a state that the focus lens stops. In this case, the image data is analyzed to obtain an evaluation value of contrast, and a temporal change of the evaluation value is monitored. When the evaluation value falls below a predetermined value, the preliminary adjustment is performed again.

In the meantime, the preliminary adjustment and the regular adjustment may be performed in a predetermined cycles until the release button is depressed halfway in the C-AF mode. In this case, when the release button has been fully depressed in the C-AF mode, shooting is performed without the regular adjustment. By virtue of this, it is possible to perform the shooting more smoothly when the C-AF mode is selected.

Some of the electronic cameras comprise a ranging sensor for measuring a subject distance to perform the focus adjustment on the basis of the subject distance in addition to the image contrast. In this kind of the electronic camera, it is possible to detect a focal position, where the contrast becomes maximum, by moving the focus lens within a search range narrowed on the basis of the subject distance. Further, it is possible to detect the focal position directly from the subject distance. Thus, it is possible to shorten a time required for the focus adjustment.

Figure 11:
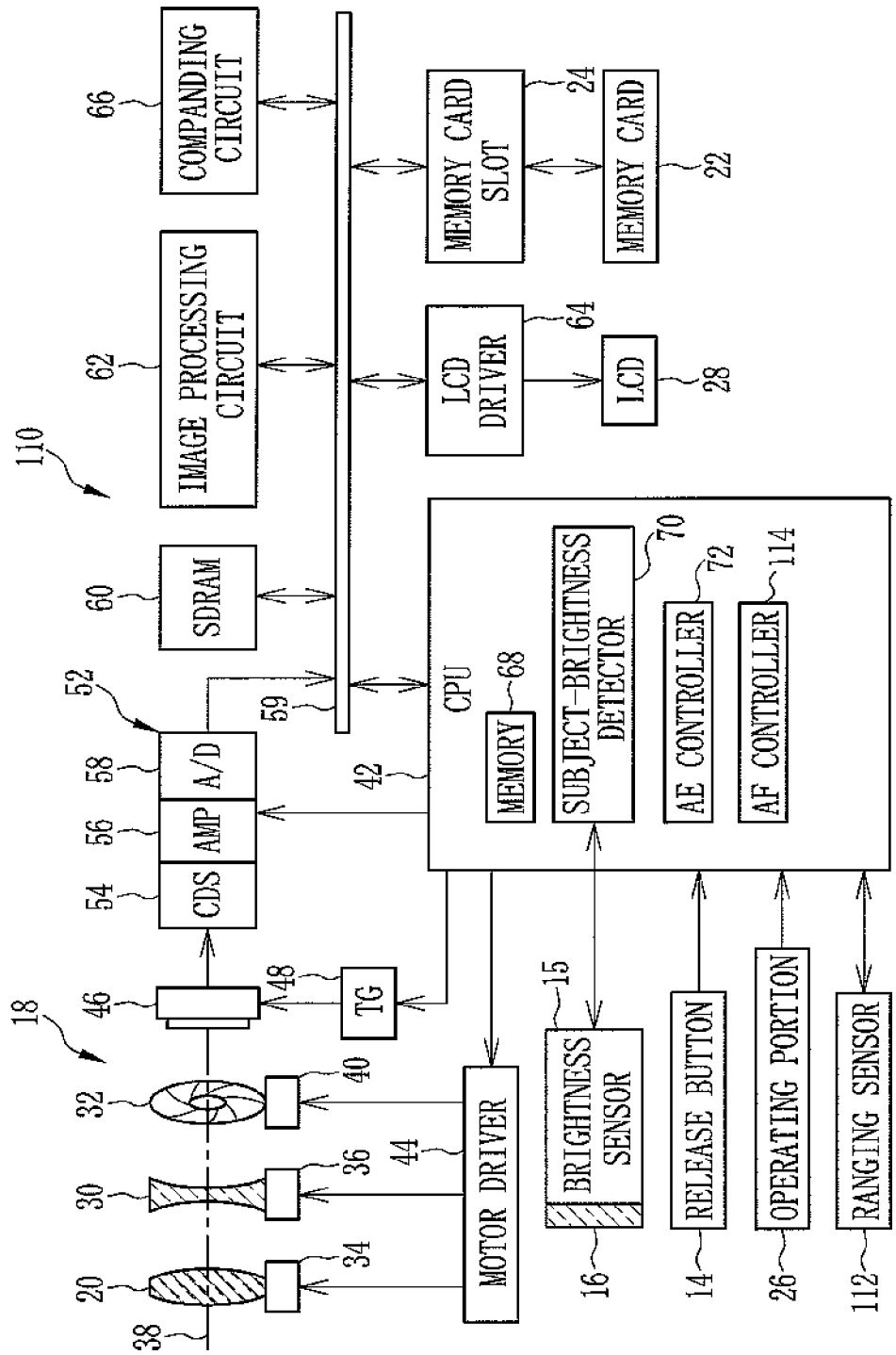
FIG. 11 is a block diagram showing a structure of the other electronic camera.
Figure 12:
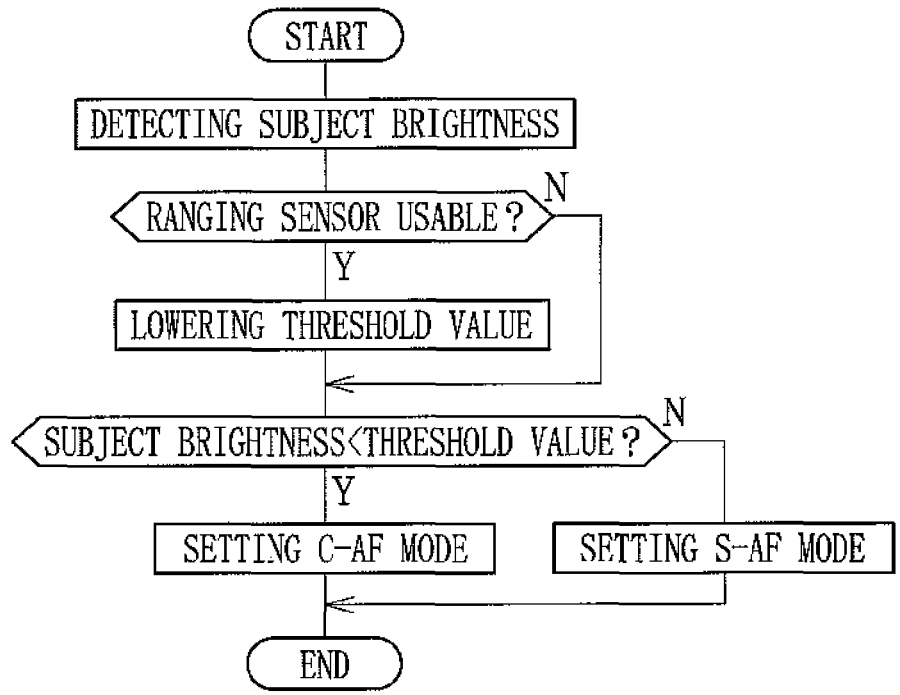
FIG. 12 is a flowchart showing a procedure for changing the focus adjustment mode.

For example, such as an electronic camera 110 shown in FIG. 11, a ranging sensor 112 is provided in addition to the brightness sensor 15 and the subject-brightness detector 70. In changing the focus adjustment mode on the basis of the subject brightness, an AF controller 114 judges whether the ranging sensor 112 is usable or not as shown in FIG. 12. When the ranging sensor 112 is unusable because of unusable setting, occurrence of an error and so forth, the threshold value (6 Ev, for instance) of the subject brightness stored in the memory 68 is used as it is. When the ranging sensor is usable, it is preferable that the threshold value of the subject brightness is lowered (from 6 Ev to 4 Ev, for instance) and switching of the focus adjustment mode is performed. In another way, the ranging sensor 112 measures the subject distance prior to the focus adjustment. On the basis of the measured subject distance, the AF controller 114 narrows a movement range of the focus lens. Further, the AF controller 114 judges whether the subject distance measured by the ranging sensor 112 is proper or not. When it has been judged that the measured subject distance is proper, the AF controller 114 changes the threshold value so as to lower a ratio of selection of said continuous AF mode.

Figure 14:
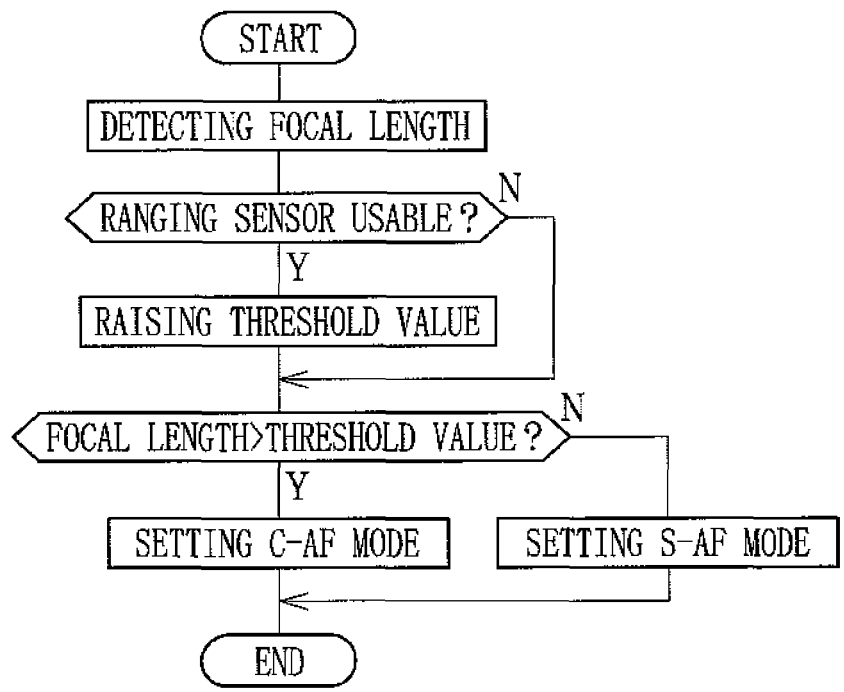
FIG. 14 is a flowchart showing a procedure for changing the focus adjustment mode.
Figure 13:
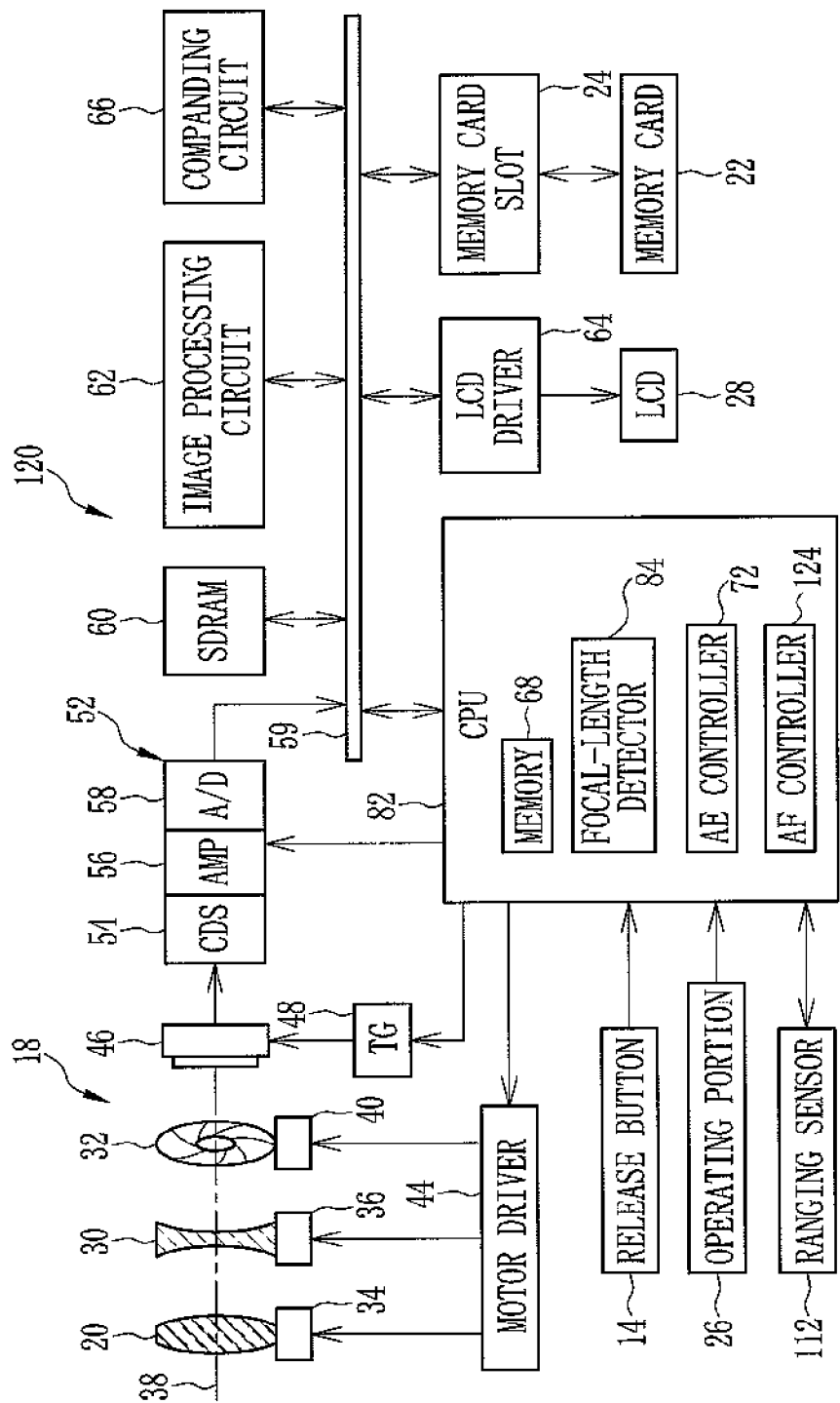
FIG. 13 is a block diagram showing a structure the other electronic camera.

For example, such as an electronic camera 120 shown in FIG. 13, the ranging sensor 112 is provided in addition to the focal-length detector 84. In changing the focus adjustment mode on the basis of the focal length, an AF controller 124 judges whether the ranging sensor 112 is usable or not as shown in FIG. 14. When the ranging sensor 112 is unusable, the threshold value (30 mm, for instance) of the focal length is used as it is. When the ranging sensor 112 is usable, it is preferable that the threshold value of the focal length is raised (from 3 mm to 5 mm, for instance) and switching of the focus adjustment mode is performed.

When the ranging sensor is usable, the S-AF mode may be selected regardless of the subject brightness and the focal length. When the ranging sensor is unusable, the subject brightness and the focal length may be compared with the threshold values thereof. On the basis of a comparison result, the S-AF mode and the C-AF mode may be changed.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An imaging device in which a regular image for recording is taken upon an operation of a release button performed during a take of a through image, said regular image being stored in a storage medium, said imaging device comprising:

a first focus adjuster for performing focus adjustment by driving a focus lens so as to maximize a focus evaluation value representing contrast of said through image;

a mode selector for changing a focus adjustment mode between a continuous AF mode in which said focus adjustment is repeated during the take of said through image, and a single AF mode in which said focus adjustment is performed at a time when said release button has been operated during the take of said through image;

a focal-length detector for detecting a focal length on the basis of a position of a zoom lens;

a mode controller for changing said focus adjustment mode to said single AF mode when said focal length falls below a predetermined threshold value, said mode controller changing said focus adjustment mode to said continuous AF mode when said focal length exceeds said threshold value; and further comprising:

a subject-distance measuring unit for measuring a subject distance of a subject prior to an operation of said first focus adjuster;

a second focus adjuster for narrowing, on the basis of said subject distance, a movement range of the focus lens to be moved by said first focus adjuster;

a judgment portion for judging whether the subject distance measured by said subject-distance measuring unit is proper or not; and a threshold-value changer for changing said threshold value so as to lower a ratio of selection of said continuous AF mode when it has been judged that said subject distance is proper.

2. The imaging device according to claim 1, further comprising:
an informing unit for notifying the focus adjustment mode currently selected.

3. The imaging device according to claim 2, wherein said informing unit is a display on which said through image is shown, said display showing a mark, which represents the currently selected focus adjustment mode, together with said through image.

4. The imaging device according to claim 2, wherein said informing unit is a speaker notifying the currently selected focus adjustment mode by generating a sound.

5. The imaging device according to claim 1, wherein a sort of the focus adjustment mode selected at a time of taking the regular image is stored in the storage medium as additional information added to said regular image.

6. The imaging device according to claim 1, further comprising:
a memory for storing said threshold value, said mode controller reading said threshold value from said memory to compare this threshold value with said focal length.

7. The imaging device according to claim 1, wherein said imaging device is an electric camera and said storage medium is a memory card removably loaded into a slot formed in a lateral side of said electronic camera.

* * * * *